US011146945B2

(12) United States Patent
Li et al.

(10) Patent No.: US 11,146,945 B2
(45) Date of Patent: Oct. 12, 2021

(54) DIFFERENTIATING USER EQUIPMENT TYPES BASED ON TCP SIGNATURES

(71) Applicant: Verizon Patent and Licensing Inc., Arlington, VA (US)

(72) Inventors: Feng Li, Lexington, MA (US); Haim S. Ner, Fair Lawn, NJ (US); Parry Cornell Booker, Arlington, TX (US); John P. Demko, McDonald, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 75 days.

(21) Appl. No.: 16/657,775

(22) Filed: Oct. 18, 2019

(65) Prior Publication Data

US 2021/0120400 A1    Apr. 22, 2021

(51) Int. Cl.
| | | |
|---|---|---|
| *G06F 12/14* | (2006.01) | |
| *H04W 8/22* | (2009.01) | |
| *H04L 29/08* | (2006.01) | |
| *H04L 29/06* | (2006.01) | |
| *H04W 28/06* | (2009.01) | |
| *G06N 3/04* | (2006.01) | |
| *G06N 3/08* | (2006.01) | |
| *H04W 72/04* | (2009.01) | |
| *H04W 12/033* | (2021.01) | |

(52) U.S. Cl.
CPC ............... *H04W 8/22* (2013.01); *G06N 3/04* (2013.01); *G06N 3/08* (2013.01); *H04L 63/168* (2013.01); *H04L 67/02* (2013.01); *H04L 69/22* (2013.01); *H04L 69/326* (2013.01); *H04W 28/06* (2013.01); *H04W 72/048* (2013.01); *H04L 63/0428* (2013.01); *H04W 12/033* (2021.01)

(58) Field of Classification Search
CPC ..... H04W 8/22; H04W 28/06; H04W 72/048; H04W 12/0013; H04L 67/02; H04L 69/326; H04L 69/22; H04L 63/168; H04L 63/0428

See application file for complete search history.

(56) References Cited

U.S. PATENT DOCUMENTS

| | | | |
|---|---|---|---|
| 10,038,715 B1* | 7/2018 | Majkowski | ......... H04L 63/1416 |
| 2006/0095969 A1* | 5/2006 | Portolani | ............ H04L 67/1002 |
| | | | 726/23 |
| 2014/0280889 A1* | 9/2014 | Nispel | ..................... H04L 63/20 |
| | | | 709/224 |
| 2016/0315909 A1* | 10/2016 | von Gravrock | ..... H04L 63/1425 |
| 2018/0176191 A1* | 6/2018 | du Toit | ............... H04L 63/0428 |

* cited by examiner

*Primary Examiner* — Lan-Huong Truong

(57) ABSTRACT

Network devices may receive a Transport Control Protocol (TCP) segment from a user device. The TCP segment includes a TCP header and a payload, and the payload includes either a Hypertext Transfer Protocol (HTTP) plaintext message or a Secure HTTP (HTTPS) encrypted message. The network devices may extract a TCP Synchronization (SYN) signature from the TCP header and determine whether the payload of the TCP segment includes a HTTP plaintext message or a HTTPS encrypted message. When the payload includes a HTTP plaintext message, the network devices may extract contents of a HTTP User-Agent field from the HTTP plaintext message, determine a device type identifier (ID) and a category ID based on the extracted contents, and update a plurality of device signatures based on the TCP signature, the device type ID, and the category ID.

20 Claims, 8 Drawing Sheets

| DEVICE | CATEGORY | SCALING FACTOR (N) | MAX RWIN | INITIAL RWIN |
|---|---|---|---|---|
| MODEL 1 | 5G | 9 | 8M | 82K |
| MODEL 2 | 5G | 11 | 8M | 1M |
| MODEL 3 | 5G | 12 | 32M | 8M |
| MODEL 4 | 4G | 8 | 6M | 82K |

FIG. 8

DIFFERENTIATING USER EQUIPMENT TYPES BASED ON TCP SIGNATURES

BACKGROUND INFORMATION

Millimeter wave bands have attracted considerable attention for the Fifth Generation (5G) cellular networks. The millimeter bands offer more spectra than other current advanced networks (e.g., Fourth Generation (4G) Long-Term Evolution (LTE) networks), to provide greater bandwidth (e.g., 2 Gigabits per second) and less latency. This is creating new traffic optimization challenges for mobile network operators as more technologically advanced user devices, with greater Central Processing Unit (CPU) processing power and memory, make use of the millimeter bands.

DETAILED DESCRIPTION OF PREFERRED EMBODIMENTS

The following detailed description refers to the accompanying drawings. The same reference numbers in different drawings may identify the same or similar elements.

In delivering high quality services to users of communication devices (e.g., User Equipment (UE) devices), many of today's network service providers attempt to identify or discriminate different types and categories of UE devices. Device type and category identification is important for many purposes, such as tethering device detection, customizing Quality of Experience (QoE) profiles for different device types, etc.

In the context of deployment of advanced networks (e.g., Next generation wireless networks), service providers need to discriminate Fifth Generation (5G) devices from other categories of wireless devices (e.g., Long-Term Evolution (LTE)/Fourth Generation (4G), etc.) to tailor their services to device categories. For example, a service provider may wish to identify 5G devices to provide a service that uses much higher link capacity of the 5G devices (e.g., place the 5G UE devices on a fast data path).

In the past, when a UE device attached to a service provider's network and initiated a Hypertext Transfer Protocol (HTTP) session, the service provider identified/differentiated the device based on a User-Agent field within the HTTP header. Unfortunately, with wide use of the Transport Layer Security (TLS)/Secure Socket Layer (SSL), most HTTP traffic is now encrypted as Secure HTTP traffic. This renders HTTP-based device type Identification schemes ineffective.

Figure 1A:
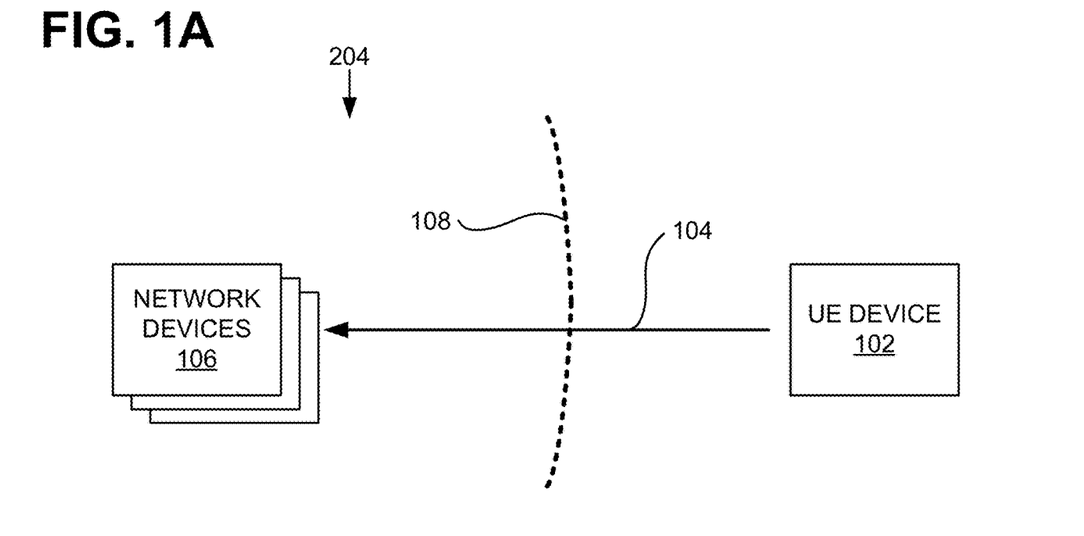
FIGS. 1A-1C illustrate the concepts described herein.
Figure 1B:
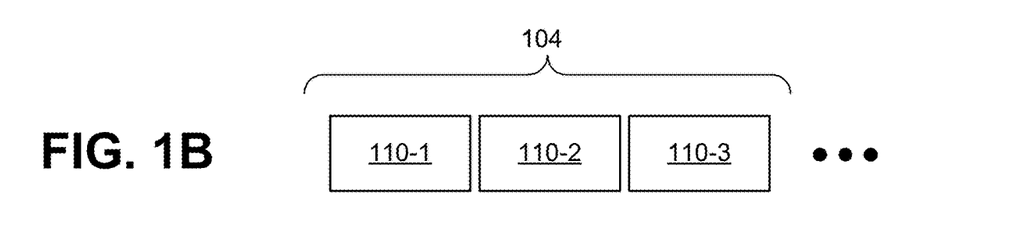
Figure 1C:
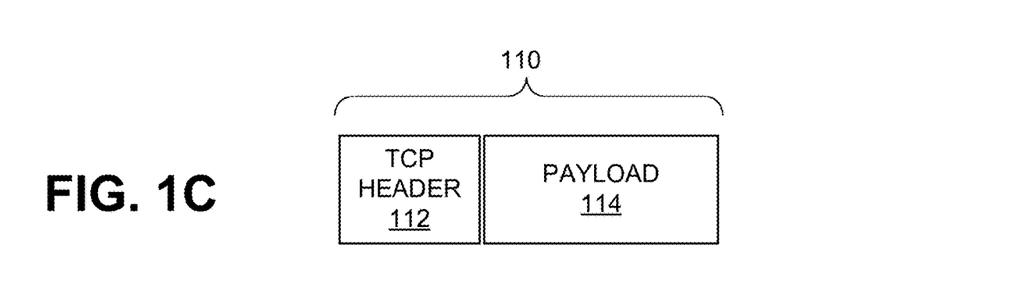

FIGS. 1A-1C illustrate the concepts described herein. FIG. 1A depicts a UE device 102 establishing a HTTP/HTTPS session channel 104 with network devices 106. Network boundary 108 separates network devices 106 from devices outside of network 204. UE device 102, network devices 106, and network 204 are described in greater detail below with references to FIGS. 2-8.

FIG. 1B depicts information carried over HTTP/HTTPS session channel 104. As shown, the information includes Transmission Control Protocol (TCP) segments 110-1, 110-2, and 110-3 (referred to individually as TCP segment 110 and collectively as TCP segments 110). The information may include additional TCP segments, though they are not illustrated. FIG. 1C shows exemplary components of TCP segment 110. As illustrated, TCP segment 110 includes a TCP header 112 and a payload 114.

In FIGS. 1A-1C, when UE device 102 and network devices 106 conduct a HTTP session, payload 114 carries a HTTP header and a HTTP payload. The HTTP header includes multiples fields, one of which is a HTTP User-Agent field. The HTTP User-Agent field includes device type and category information. For example, a HTTP User-Agent field may include the following text string:

User-Agent: Instagram 9.7.0 (iPhone8, 2; iOS 10_0_2; en-US; scale=2.61; 1080×1920)

From the text string, one can identify the type of device, the operating system that runs on the device, etc. Furthermore, the device type indicated in the string also identifies whether the device supports 5G, 4G, or another type of communication (i.e., device category).

When payload 114 is not encrypted, the text string is in plaintext, and therefore its contents are readable by another device with access to channel 104. In contrast, if channel 104 is a TLS/SSL channel, payload 114 is encrypted. The text string is not in plaintext, and device-type and category information cannot be obtained by extracting the HTTP User-Agent field.

A system described herein may differentiate or identify different types or categories of UE devices that are attached to the network based on the HTTP/HTTPS channel, even when the channel is encrypted under the TLS/SSL. More specifically, the system relies on TCP signatures to differentiate or identify different UE device types/categories.

In operation, when a channel is not encrypted and carries HTTP data, the system uses the channel data to learn to differentiate or identify UE device types/categories. More specifically, the system (1) extracts contents of TCP headers to obtain TCP signatures (i.e., input vectors); and (2) determines user device types and categories based on the HTTP User-Agent fields. The system then learns a relationship between the training input (i.e., TCP signatures) and the determined device types/categories. When incoming channel data is HTTPS (i.e., encrypted), the system extracts TCP signatures from the TCP headers, and based on the learned relationship, determines the most-likely device types/categories of the UE devices that transmitted the TCP segments.

Figure 2:
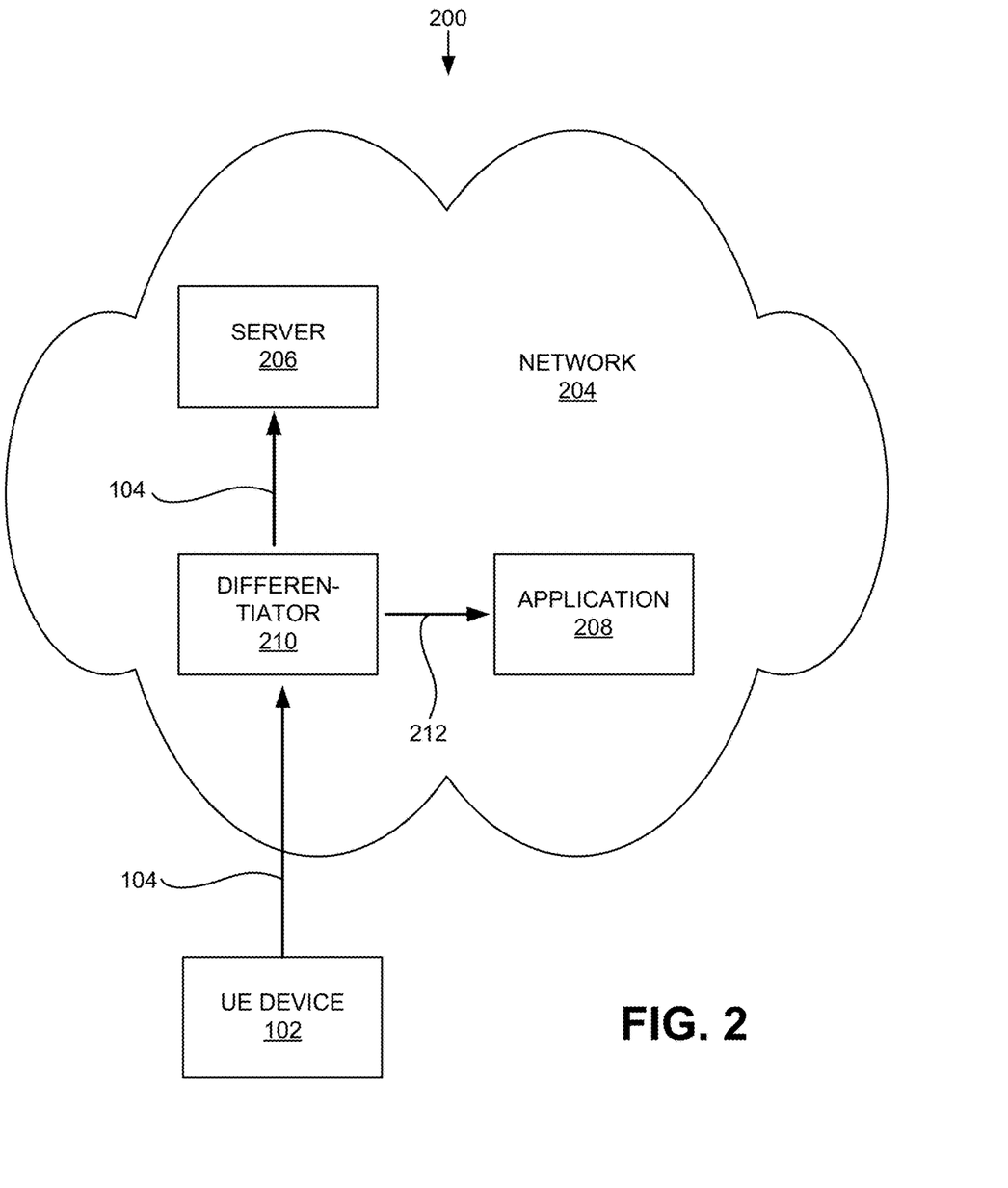
FIG. 2 depicts an exemplary network environment in which the concepts described herein maybe implemented.

FIG. 2 depicts an exemplary network environment 200 in which the concepts described herein may be implemented. As shown, network environment 200 may include UE device 102 and network 204. Device 102 may include a communication device. Examples of device 102 include: a personal computer that is connected to a network; a smart phone; a tablet device; a wearable computer device (e.g., a smart watch); a global positioning system (GPS) device; a laptop computer; a media playing device; a portable gaming system; and an Internet-of-Things (IoT) device. In some implementations, device 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. Device 102 may send packets over or to network 204 through a wireless link, optical link, wired link, etc.

Network 204 may provide device 102 with communication services. Network 204 may include an access network (e.g., a radio network), which allows device 102 to access network 204. To do so, the access network may establish and maintain, with participation from device 102, an over-the-air or over-the-wire channel with device 102; and maintain backhaul channels with a core part of network 204.

Network 204 may include one more access networks, such as wireless access networks. The access networks may include a Long-term Evolution (LTE) radio network, a 5G radio network, or other advanced radio network(s). These radio networks may include many wireless stations for establishing and maintaining an over-the-air channel with devices 102.

Network 204 may also include a local area network (LAN), a wide area network (WAN), a metropolitan area network (MAN), an optical network, a cable television network, a satellite network, a wireless network (e.g., a CDMA network, a general packet radio service (GPRS) network, an LTE network (e.g., a 4G network), a 5G network, an ad hoc network, a telephone network (e.g., the Public Switched Telephone Network (PSTN), an intranet, or a combination of networks. Network 204 may allow the delivery of Internet Protocol (IP) services to device 102, and may interface with other networks, such as packet data networks. In some implementations, the packet data networks may include an IP network, such as an IP Multimedia Subsystem (IMS) network. An IMS network may provide a Short Messaging Service (SMS), Voice-over-IP (VoIP) service, etc.

As further shown in FIG. 2, network 204 includes a server 206, an application 208, and a differentiator 210. Server 206 may include a server device and/or a server program that UE device 102 may access over HTTP/HTTPS channel 104 for a particular service. That is, the destination address of TCP segments 110 is the IP address of server 206.

Application 208 may implement a program to render a particular service to UE device 102 when differentiator 210 identifies the type or the category of UE device 102. Application 208 may perform its function when it receives information that identifies the device type and category over channel 212.

Differentiator 210 may include one or more devices for intercepting TCP segments 110 on HTTP/HTTPS channel 104, which extends from UE device 102 to server 206. When the intercepted TCP segments 110 include a plaintext HTTP User-Agent field, differentiator 210 extracts: (1) device type and category information from the HTTP/HTTPS User-Agent field; and (2) TCP signatures from the TCP segments 110. Based on the determined TCP signatures and the device type/category information, differentiator 210 applies machine-learning (ML), to learn to discriminate different types of devices and categories based on the TCP signatures. Once differentiator 210 has been trained, differentiator 210 may determine the device types and categories based only on TCP signatures, without HTTP User-Agent field information (i.e., when TCP payload is encrypted).

Depending on the implementation, network environment 200 may include networks other than network 204. Furthermore, for simplicity, FIG. 2 does not show all components that may be included in network environment 200 (e.g., routers, bridges, wireless access point, additional devices 102). That is, depending on the implementation, network environment 200 may include additional, fewer, different, or a different arrangement of components than those illustrated in FIG. 2.

Figure 3:
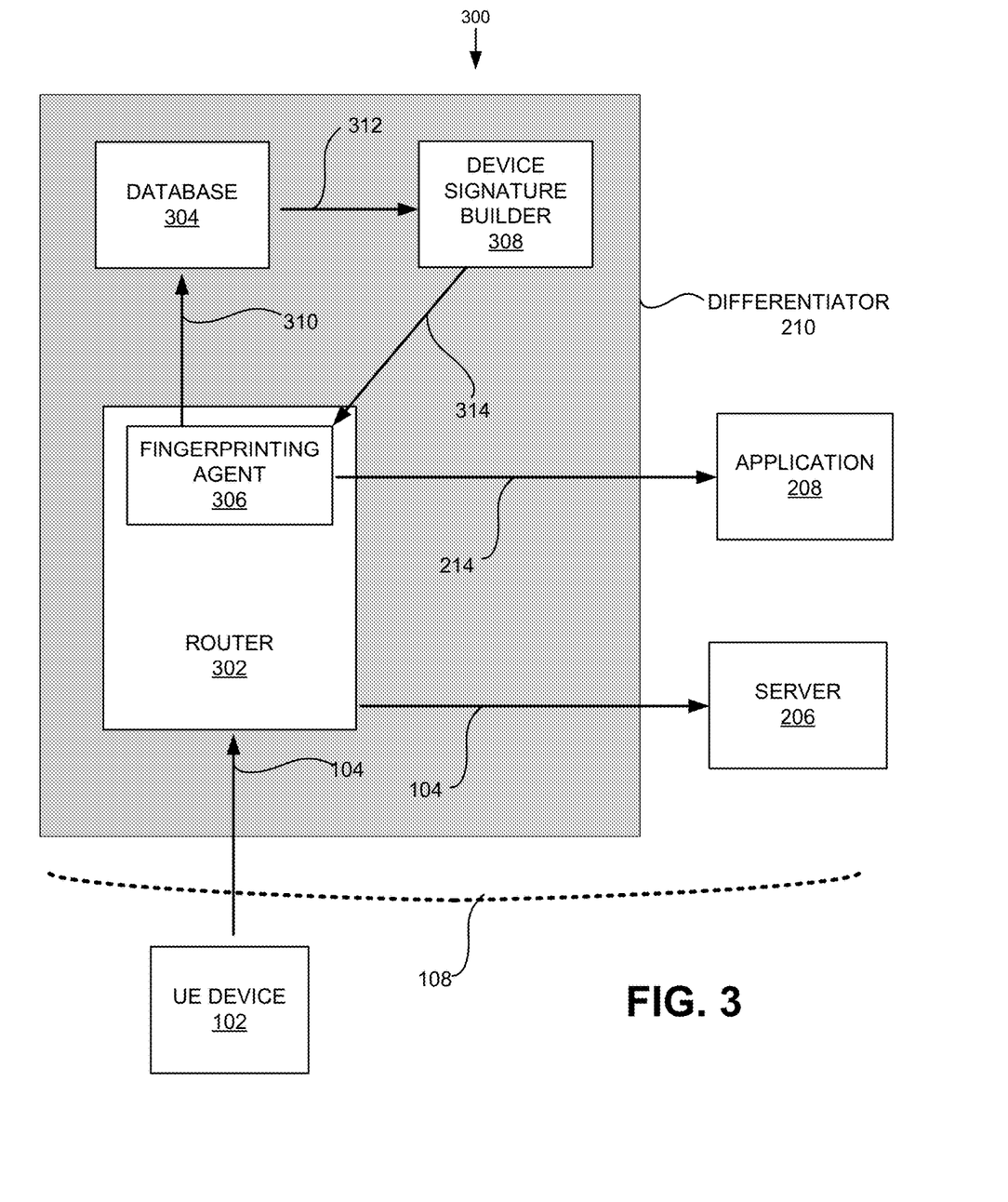
FIG. 3 shows a portion of the network environment of FIG. 2.

FIG. 3 shows a portion 300 of network environment 200 of FIG. 2. As shown, portion 300 may include UE device 102, server 206, application 208, a router 302, a database 304, a device signature builder 308. Router 302, database 304, and device signature builder 308 are components of differentiator 210. Although differentiator 210 may include other components, they are not illustrated in FIG. 3 for simplicity. UE device 102, server 206, and application 208 have been described above with references to FIGS. 1A-1C and 2.

Router 302 may forward TCP segments 110 from UE device 102 over HTTP/HTTPS channel 104 to their destinations. In FIG. 3, it is assumed that the destination of the TCP segments 110 is server 206. In other implementations, other types of device may take the place of router 302, such as, for example, a middle-box, a gateway, and a proxy device. As shown, router 302 (or another type of device for forwarding TCP segments 110) includes a fingerprinting agent 306.

Fingerprinting agent 306 extracts different components of the received TCP segments 110 of a HTTP/HTTPS session and processes the extracted components. Depending on whether the payload 114 of the TCP segments 110 are encrypted under the TLS/SSL, fingerprinting agent 306 may extract and/or process the TCP segments 110 differently.

When payloads 114 of TCP segments 110 of a HTTP/HTTPS session are encrypted under the TLS/SSL, fingerprinting agent 306 may extract the contents of TCP headers 112 to obtain TCP signatures and compare the extracted TCP signatures to device signatures. The device signatures may have been obtained by and sent from device signature builder 308. Fingerprinting agent 306 may determine the device type/category based on the result of the comparison, to obtain a device type identifier (ID) and a category ID. Fingerprinting agent 306 may send the device type ID, the category ID, and a flow ID (e.g., information that identifies a source address, a destination address, a source port, a destination port, etc.) to application 308, over channel 214.

When payloads 114 of TCP segments 110 of the HTTP/HTTPS session are not encrypted, fingerprinting agent 306 may not only extract the contents of TCP headers 112 to obtain TCP signatures, but also extract HTTP User-Agent fields from the HTTP message in the payloads 114. By parsing the text strings in the HTTP User-Agent field, fingerprinting agent 306 may obtain the various tokens/identifiers associated with UE device 102. The tokens may indicate, for example, the operating system (OS) running on the UE device 102 (e.g., iOS, Android, etc.), the version of the OS, the make of the UE device 102 (e.g., Galaxy Note II, iPhone, etc.). Based on the tokens/identifiers, fingerprinting agent 306 may determine the device type ID (which may indicate what type of UE device 102 is sending the TCP segments) and a category ID of UE device 102. Thereafter, fingerprinting agent 306 may provide the device type ID, the category ID, and the TCP signatures to database 304 over channel/data path 310. Furthermore, fingerprinting agent 306 may send the device type ID, the category ID, and a flow ID to application 308, over channel 214.

Database 304 may place data points received from fingerprinting agent 306 in persistent storage. Each data point may include a device type ID, a category ID, and a TCP signature. Device type ID, category ID, and TCP signature are described in greater detail with reference to FIG. 5. In addition to storing device type IDs, category IDs, and TCP signatures, database 304 may provide them to device signature builder 308, when database 304 receives a request for such information from device signature builder 308 or based on some criteria (e.g., periodically or when a particular number of new data points are received from fingerprinting agent 306).

Device signature builder 308 may obtain data points from database 304, where each data point includes a device type ID, a category ID, and a TCP signature. Using the received data, device signature builder 308 may perform machine learning (ML), to learn to identify the device type and category based on TCP signatures. Depending on the embodiment, device signature builder 308 may employ different techniques for ML. For example, in one embodiment, device signature builder 308 may employ the K-means clustering for ML. In a different embodiment, device signature builder 38 may use another technique, such as those involving artificial neural networks (e.g., back-propagation, competitive network, etc.

Assuming that device signature builder 308 implements THE K-means clustering technique, when device signature builder 308 has processed incoming data points to learn or update its learning, device signature builder 308 may generate device signatures (in contrast to TCP signatures that it uses for ML) and forward them to fingerprinting agent 306. As noted above, fingerprinting agent 306 may use device signatures from builder 308 to identify the device type and category of UE device 102 (i.e., produce a device type ID and a category ID), by applying the devices signatures to TCP signatures.

Depending on the implementation, differentiator 210 may include additional, fewer, different, or a different arrangement of components than those illustrated in FIG. 3. For example, in one implementation, a single device may host fingerprinting agent 306, database 304, and device signature builder 308. In such an implementation, fingerprinting agent 306, database 304, and device signature builder 308 may exchange data over data paths within a single device.

In a different implementation, fingerprinting agent 306 may use artificial neural networks to determine device type IDs and category type IDs based on TCP signatures. In such implementations, device signature builder 308 may be replaced by a neural network training module. The module would update neural network weights (based on incoming data) and provide the updated weights to fingerprinting agent 306. In still other implementations, differentiator 210 may use other type of ML to produce device type IDs and category IDs.

Figure 4:
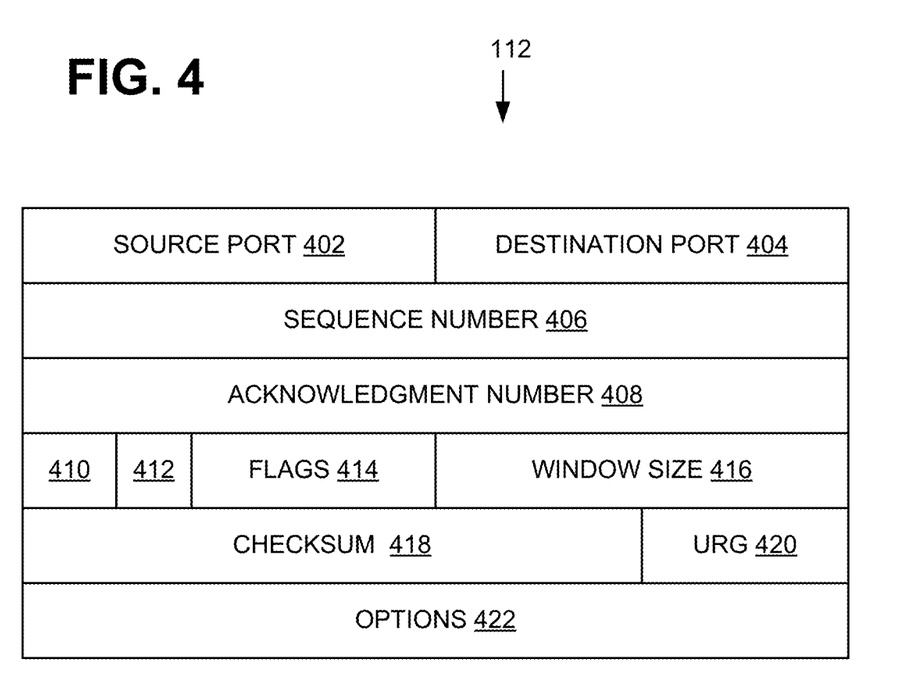
FIG. 4 shows exemplary fields of the TCP header of FIG. 1C.

FIG. 4 shows exemplary fields of the TCP header 112 of FIG. 1C. Fingerprinting agent 306 may obtain or derive TCP signatures from the contents of one or more of the fields of TCP header 112. As shown, TCP header 112 may include a source port field 402, destination port field 404, sequence number field 406, acknowledgment number field 408, data offset field 410, reserved field 412, flags field 414, window size field 416, checksum field 418, urgent pointer field 420, and options field 422.

Source port field 402 and destination port field 404 may include a source port number and a destination port number, respectively, of the TCP session between two endpoints. Sequence number field 406 may include one of two possible types of information, depending on one of the flag values in flags field 414. If a flag known as the SYN flag is set (e.g., the bit representing the flag is 1), sequence number field 406 may carry the initial sequence number of the first segment in the TCP session. If the SYN flag is clear (i.e., set to 0), sequence number field 406 may include the sum of the initial sequence number, and the number of segments preceding the current segment in the TCP session. Acknowledgment number field 408 may include the next sequence number which the sender of the current segment is expecting when a flag known as an ACK flag (within the flags field 414) is set.

Data offset field 410 may include a value equal to the length of TCP header 112. Reserved field 412 may be reserved for future use and currently could be set to zero. Flags field 414 may include multiple flags that characterize the TCP header 112 that includes the field 414. Two of the flags are the SYN flag and the ACK flag. The first packets from both endpoints of the TCP session may have the SYN flag set. The term "SYN packet," as used herein, may refer to either of these first packets. All packets that follow the SYN packets have the ACK flag set. The term "ACK packet," as used here in, may refer to any of these packets.

Window size field 416, in combination with the window scale field (described below), may indicate the size of the receive window (e.g., buffer), which the sender of the current TCP segment has allocated to receive data. Checksum field 418 may include a checksum of the contents of TCP header 112, payload 114, and other information. Urgent field 420 may indicate, when a flag known as the URG flag in flags field 414 is set to indicate that the current TCP segment carries "urgent" data, a value which identifies the end of urgent data in the current TCP segment.

Options field 422 may include one or more optional values. One of the optional values may include a 24-bits field known as a window scale field. The window scale field may indicate a multiplier by which the window size (i.e., the value in window size field 416) may be scaled to convey the actual receive window size. For example, assume that window size field 416 indicates a number and the window scale field indicates N (i.e., an integer). Then the actual size of the window is given by:

$$RWIN = RAW\_WIN \times 2^N \qquad (1)$$

In expression (1), RWIN is the actual receive window size, and RAW_WIN is the value of window size field 416.

Under the TLS/SSL protocol, although payload 114 of a TCP segment 110 is protected by the encryption scheme, TCP header 112 is still in plaintext. Hence, the contents of various fields 402-422 of TCP header 112 are available to network entities that intercept the TCP segments 110. Furthermore, different types and/or categories of devices that send TCP segments 110 may populate these TCP header fields 402-422 with different values. Based on at least some of these field values, differentiator 210 may infer likely device types and/or categories.

Figure 5:
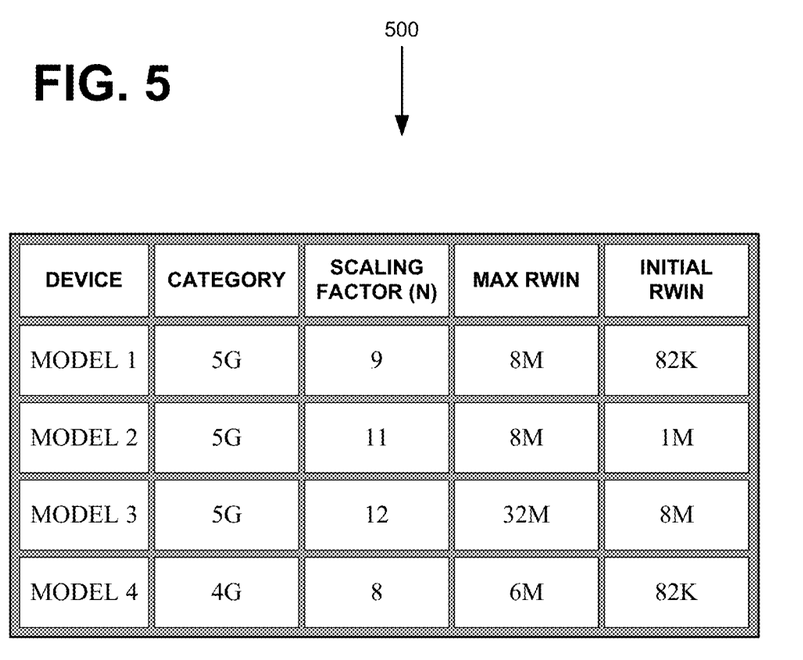
FIG. 5 shows a table of exemplary receive window sizes and window scales for different user equipment (UE) types and UE categories.

FIG. 5 shows a table 500 of devices types and categories for exemplary actual window sizes, obtained in accordance with expression (1) based on the window scale field and window size field 416 of the TCP header 112. In particular, table 500 shows Samsung S10, Motorola Z3, Motorola Z4, and Samsung S8 for exemplary values of the window scale field in TCP segments 110 sent from such devices. As shown, the devices start at an initial actual window size (INITIAL RWIN in table 500) and are capable of increasing the actual window size to MAX RWIN, detected from TCP headers 112.

As also shown, all devices with 5G capability (Samsung S10, Motorola Z3 and Motorola Z4) show the maximum receive window size greater than 8 MB, while Samsung S8 shows the maximum receive window size of 6 MB. Table 500 clearly shows that the maximum values of window size field 416 (RWIN) for 5G devices are different from those of 4G devices, and thus MAX RWIN sizes can be used in discriminating 5G devices from 4G devices. In addition to maximum RWIN size (i.e., values of window size field 416 at their maximum during the TCP session), the values of the window size field (N) can also be used to aid in distinguishing different device types. As table 500 shows, Android devices (i.e., Samsung S10 and Samsung S8) from the same manufacturer (i.e., Samsung) have different values N for the window scale field. Thus, the values of window size field 416 (RWIN), the maximum the window size (MAX RWIN), and window scale field (N) may be used to differentiate devices types and categories.

Window size field 416 is 16-bits long. Hence, the receive window size may go up to 64 KB. The window scale field is 8-bits long, and if the value of the field is N, the factor is $2^N$. Because the window scale field is only 1 byte long, it cannot be used by itself to accurately discriminate all different device models. Theoretically, using different values of the window scale field can only differentiate 256 different devices, while the number of device types is much larger than 256. Furthermore, some devices may share the same value for the window scale. However, the values of window size field 416, the window scale field, and the maximum window size may be used in combination as TCP signatures as input to signature builder 308, to train differentiator 210 to identify device types and/or categories, e.g. 5G devices and 4G devices, IoT devices, etc.). As described above, in one embodiment, device signature builder 308 may apply K-means clustering to collected data points (e.g., TCP signatures, device type ID, and category ID).

Figure 6:
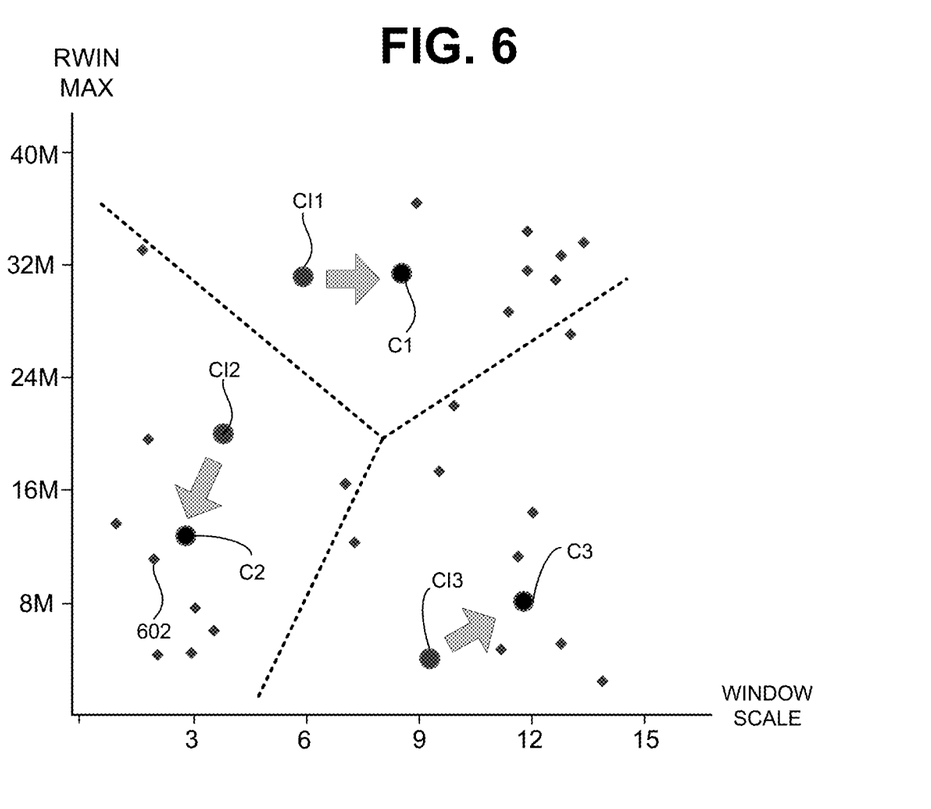
FIG. 6 illustrates an exemplary K-means clustering.

FIG. 6 is a graphical illustration of an exemplary K-means clustering according to an exemplary implementation of TCP signature. The K-means clustering is performed on data points obtained from unencrypted TCP segments 110. As shown, the horizontal axis represents values of the window scale field (N) and the vertical axis represents the maximum values of window size field 416 (MAX RWIN). Assume that each diamond on the plot represents a data point from of a TCP header 112 of unencrypted TCP segment 110 from a single UE device 102.

In FIG. 6, C1, C2, and C3 represent device signatures of different UE device types (e.g., Motorola Z3, Motorola Z4, Samsung S10, and Samsung S8). For example, C1 may represent Motorola Z3. Also as shown, the dotted lines partition the graph plane into three clusters. Each data point of a cluster is closest to the particular device type (i.e., C1, C2, or C3). For example, diamond 602 is closest to C2 (in comparison to its proximity to C1 and to C3), and thus belongs in the cluster in which C2 resides.

Each of CI1, CI2, and CI3 represents an initial device signature for the corresponding cluster. The device signatures CI1, CI2, and CI3 are recalculated by device signature builder 308 as fingerprinting agent 306 receives data points (i.e., values of window size field 416 and the window scale field of TCP segments) along with device type ID and category ID inferred from unencrypted HTTP User-Agent fields. As a result of the recalculation, CI1, CI2, and CI3 may shift (e.g., in the directions of the arrows illustrated in FIG. 6) to C1, C2, and C3. As a result of the shift, the plotted points may need to be re-clustered. For example, after one recalculation, a data point that used to belong to CI1 may be re-clustered so that it belongs to C2 or C3.

When fingerprinting agent 306 obtains a TCP signature from a TCP segment 110 that is encrypted under the TLS/SSL, fingerprinting agent 306 may classify the TCP signature as belonging to C1, C2, or C3, depending on to which one of C1, C2, and C3 the TCP signature is closest. For example, if the TCP signature of a TCP segment 110 is closest to C1, fingerprinting agent 306 may determine that the device type ID and category ID of UE device 102 that sent the TCP segment 110 are those of C1.

Figure 7:
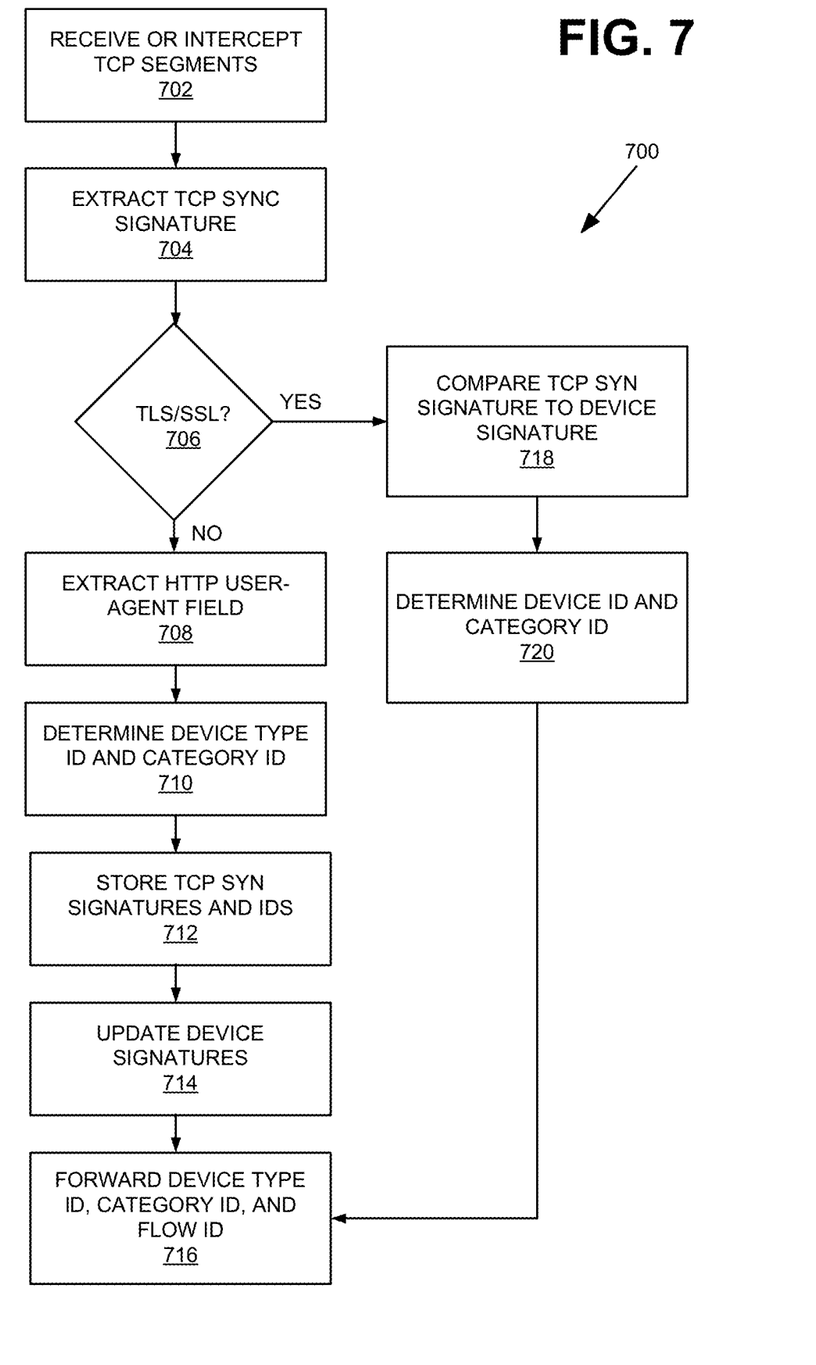
FIG. 7 is a flow diagram of an exemplary process that is associated with the differentiator of FIG. 2.

FIG. 7 is a flow diagram of an exemplary process 700 that is associated with differentiator 210 of FIG. 2. Process 700 may be performed by different components of differentiator 210, such as database 304, fingerprinting agent 306, and device signature builder 308. As shown, process 700 may include receiving or intercepting one or more TCP segments 110 of HTTP/HTTPS session between a UE device 102 and a network device (e.g., a server) (block 702). Depending on the implementation, the network component that intercepts the TCP segments 110 may include a router, a middle box, a proxy device, etc.

Process 700 may further include extracting a TCP signature from the TCP segments 110 (block 704). For example, fingerprinting agent 306 may obtain the value of the window scale field (N), window size field 416 (RWIN), and the maximum value of RWIN (i.e., the maximum value of window size field 416 multiplied by $2^N$ for the TCP segments 110 that belong to the same HTTP/HTTPS session). In other implementations, the TCP signature may include other field values of TCP header 112, such as, a value of the Maximum Segment Size field (MSS) or an IP packet parameter (e.g., Maximum Transmission Unit (MTU)).

Process 700 may include determining whether the TCP segments 110 are encrypted (e.g., under the TLS/SSL) (i.e., whether payload 114 of TCP segments 110 is encrypted) (block 706). If the TCP segments 110 are not encrypted (block 706: NO), the HTTP User-Agent field may be extracted from payload 114 (block 708); and a device type ID and category ID may be determined (block 710). For example, fingerprinting agent 306 may determine whether TCP segments 110 that it intercepted at router 302 are encrypted under the TLS/SSL. If segments 110 are not encrypted, fingerprinting agent 306 may extract, from payload 114, contents of the HTTP User-Agent field. From the extracted content, fingerprinting agent 306 may determine the device type ID and category ID.

Process 700 may further include storing the TCP signature, the device type ID, and the category ID in a persistent storage device (block 712). For example, fingerprinting agent 306 may insert the TCP signature, the device type ID, and the category ID into database 304.

When one or more new TCP signatures have been obtained, they may be used to update the device signatures (block 714). For example, device signature builder 308 may read a set of TCP signatures, device type IDs, and category IDs, including those most recently obtained by fingerprinting agent 306. Next, device signature builder 308 may apply or update its K-means clustering to adjust its device signatures. In addition, device signature builder 308 may forward the updated device signatures to fingerprinting agent 306, so that fingerprinting agent 306 can apply the updated device signatures to TCP signatures to encrypted TCP segments 110.

Process 700 may include forwarding the TCP signature, the device type ID, the category ID, and a flow ID to a network application (block 716). The network application may use the information to provide a service that is appropriate for the UE device 102 type (e.g., 5G service, 4G service, high or low-bandwidth service, etc.) and its capabilities.

Referring back to block 706, if the TCP segments 110 are encrypted (block 706: YES), the TCP signature may be compared to the device signatures (block 718). For example, fingerprinting agent 306 may compare the TCP signature to its most recently updated device signatures received from device signature builder 308. As a result of the comparison, fingerprinting agent 306 may select the device signature (among the device signatures) that most closely matches the TCP signature. A device signature "closest" to the TCP signature is the one whose distance from the TCP signature is smaller than distances between the TCP signature and other device signatures. In some embodiments, a distance between a TCP signature and a device signature may be computed as a sum of the squares of the differences between each components of the TCP signature and a device signature. In other embodiments, another metric may be used to determine the distance (e.g., a sum of the absolute values of the differences between each components of the TCP signature and a device signature).

Process 700 may further include determining the device type ID and the category ID (block 720). The device signature selected at block 718 is associated with a device type ID and a category ID. Fingerprinting agent 306 may select these IDs. After block 720, process 700 may proceed to block 716.

Figure 8:
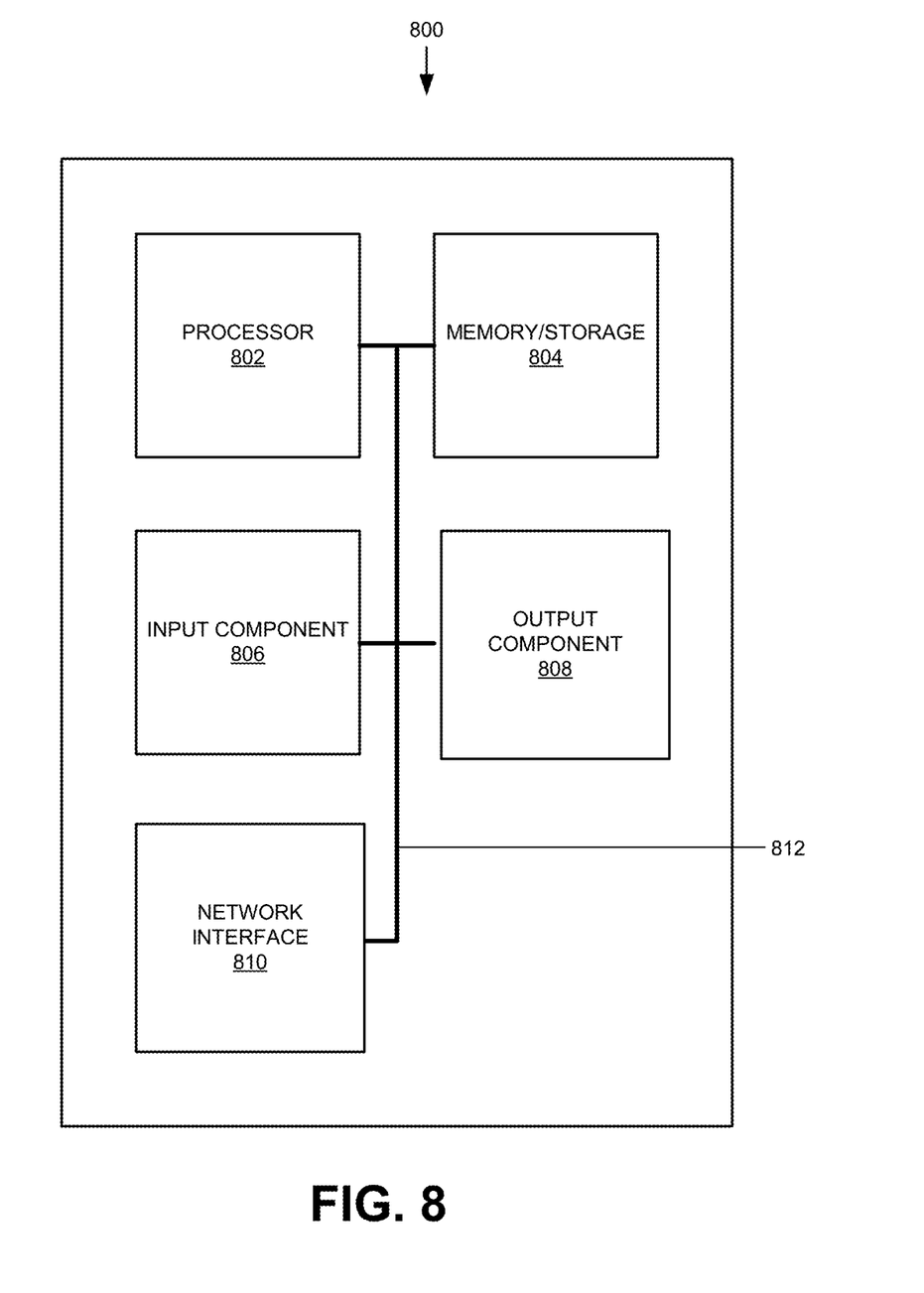
FIG. 8 shows exemplary components of a network device.

FIG. 8 depicts exemplary components of an exemplary network device 800. Network device 800 may correspond to or may be included in any of network components of FIGS. 1A-1C and 2-4 (e.g., UE device 102, a router, a network switch, servers, gateways, etc.). As shown, network device 800 may include a processor 802, memory/storage 804, input component 806, output component 808, network interface 810, and communication path 812. In different implementations, network device 800 may include additional, fewer, different, or a different arrangement of components than the ones illustrated in FIG. 8. For example, network device 800 may include a display, network card, etc.

Processor 802 may include a processor, a microprocessor, an Application Specific Integrated Circuit (ASIC), a Field Programmable Gate Array (FPGA), programmable logic device, chipset, application specific instruction-set processor (ASIP), system-on-chip (SoC), central processing unit (CPU) (e.g., one or multiple cores), graphical processing unit (GPU), microcontrollers, and/or other processing logic (e.g., embedded devices) capable of controlling device 800 and/or executing programs/instructions.

Memory/storage 804 may include static memory, such as read only memory (ROM), and/or dynamic memory, such as random access memory (RAM), or onboard cache, for storing data and machine-readable instructions (e.g., programs, scripts, etc.). The RAM may be used to map out a virtual memory, from which receive windows may be allocated.

Memory/storage 804 may also include a floppy disk, CD ROM, CD read/write (R/W) disk, optical disk, magnetic disk, solid state disk, holographic versatile disk (HVD), digital versatile disk (DVD), and/or flash memory, as well as other types of persistent storage device (e.g., Micro-Electromechanical system (MEMS)-based storage medium) for storing data and/or machine-readable instructions (e.g., a program, script, etc.). Memory/storage 804 may be external to and/or removable from network device 800. Memory/storage 804 may include, for example, a Universal Serial Bus (USB) memory stick, a dongle, a hard disk, off-line storage, a Blu-Ray® disk (BD), etc. Memory/storage 804 may also include devices that can function both as a RAM-like component or persistent storage, such as Intel® Optane memories. The storage 804 may be used in implementing, for example, database 304.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 806 and output component 808 may provide input and output from/to a user to/from device 800. Input/output components 806 and 808 may include a display screen, a keyboard, a mouse, a speaker, a microphone, a camera, a DVD reader, USB lines, and/or other types of components for obtaining, from physical events or phenomena, to and/or from signals that pertain to device 800.

Network interface 810 may include a transceiver (e.g., a transmitter and a receiver) for network device 800 to communicate with other devices and/or systems. For example, via network interface 810, network device 800 may communicate over a network, such as the Internet, an intranet, a terrestrial wireless network (e.g., a WLAN, WiFi, WiMax, etc.), a satellite-based network, optical network, etc.

Network interface 810 may include an Ethernet interface to a LAN, and/or an interface/connection for connecting device 800 to other devices (e.g., a Bluetooth interface). For example, network interface 810 may include a wireless modem for modulation and demodulation.

Communication path 812 may enable components of network device 800 to communicate with one another.

Network device 800 may perform the operations described herein in response to processor 802 executing software instructions stored in a non-transient computer-readable medium, such as memory/storage 804. The software instructions may be read into memory/storage from another computer-readable medium or from another device via network interface 810. The software instructions stored in memory/storage (e.g., memory/storage 804, when executed by processor 802, may cause processor 802 to perform processes that are described herein.

In this specification, various preferred embodiments have been described with reference to the accompanying drawings. It will be evident that modifications and changes may be made thereto, and additional embodiments may be implemented, without departing from the broader scope of the invention as set forth in the claims that follow.

For example, components similar to fingerprinting agent 306, database 304, and device signature builder 308 may be used to implement a congestion level identifying system. More specifically, the system may include a flow fingerprinting agent that collects flow signatures, based on various fields of TCP and IP headers (e.g., an Explicit Congestion Notification (ECN)-specific field within the IP header (i.e., the ECN-capable Transport bit and the Congestion Experienced bit), a flow ID, a time interval at which the segments/packets are intercepted, etc.

The congestion level identifying system may also include a congestion signature builder. The congestion signature builder may receive flow signatures (collected by flow fingerprinting agent and stored in a database), network traffic congestion condition information (e.g., traffic volume, latency, round trip time, jitter, packet loss, etc.), and congestion levels as its training data. Based on the training data, the congestion signature builder may generate/update congestion signatures, in a manner similar to that described above for device signatures (e.g., using statistical techniques such as the K-means clustering, artificial neural networks, etc.). The obtained congestion signatures may be used at the flow fingerprinting agent to determine a particular level of congestion based on input flow signature (i.e., determine to which particular congestion cluster the flow signature belongs). The determined congestion level may be used by the network to make adjustments (e.g., increase user signal power).

In some congestion level determining systems, window size field 416 of TCP header 112 may carry, in addition to the receive window size information, congestion and Radio Frequency (RF) information from UE device 102 and the base station, through which UE device 102 is attached to the network. In such implementations, each flow signature may include the congestion/RF information extracted, by the fingerprinting agent, from the window size field 416.

For example, assume that UE device 102 collects and summarizes the congestion and/or RF data and inserts the summary into a preselected bits (e.g., lower M-bits) of window size field 416. In this way, the higher bits of window size field 416 may still carry RWIN-related information. When the base station at the radio access network receives communications from UE device 102, the base station may contribute any congestion or RF information it has collected, by inserting the information into a portion of the M-bits of window size field 416. For instance, assume that M is 6 (i.e., lower 6 bits of window size field 416). Also assume that UE device 102 inserts, into the lower 3 of the M-bits of window size field 416 of a TCP segment 110, its relative signal strength. When the base station receives the TCP segment 110 from UE device 102, the base station may contribute to its share of information, by writing into the higher 3 of the M-bits of window size field 416, its own relative signal strength information.

Other modifications and changes to the embodiments described above are possible. For example, while a series of blocks have been described with regard to the processes illustrated in FIG. 7, the order of the blocks and signaling may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information of individuals, it should be understood that such information shall be collected, stored, and used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. One or more network devices comprising:
one or more processors configured to:
receive, from a user device, a Transport Control Protocol (TCP) segment that includes a TCP header and a payload, and wherein the payload includes either a Hypertext Transfer Protocol (HTTP) plaintext message or a Secure HTTP (HTTPS) encrypted message;
extract a TCP signature from the TCP header;
determine whether the payload of the TCP segment includes a HTTP plaintext message or a HTTPS encrypted message;
when the payload includes a HTTP plaintext message:
extract contents of a HTTP User-Agent field from the HTTP plaintext message;
determine a device type identifier (ID) and a category ID based on the extracted contents; and
update a plurality of device signatures based on the TCP signature, the device type ID, and the category ID;
when the payload includes a HTTPS encrypted message:
determine a device type ID and a category ID based on the TCP signature and the plurality of device signatures; and
forward data that includes the device type ID and the category ID to a network application.

2. The one or more network devices of claim 1, wherein the TCP signature includes at least two of:
a value of a window size field in the TCP header, a value of a window scale field in the TCP header, and a maximum value of the window size field.

3. The one or more network devices of claim 1, wherein when the payload includes a HTTP plaintext message, the one or more processors are further to:
store the TCP signature, the device type ID, and the category ID in a persistent storage.

4. The one or more network devices of claim 1, wherein the network application is configured to provide a service or provide a function that depends on a type of the user device and a category of the user device.

5. The one or more network devices of claim 1, wherein the device type ID indicates a model of the user device and the category ID indicates whether the device is Fourth Generation (4G) or Fifth Generation (5G) network communication capable.

6. The one or more network devices of claim 1, wherein when the one or more processors update the plurality of device signatures, the one or more processors are to:
apply a K-means clustering to the TCP signature and other TCP signatures.

7. The one or more network devices of claim 6, wherein when the one or more processors apply the K-means clustering, the one or more processors compute an average of values of a window scale field in the TCP header and an average of maximum values of the window size field.

8. The one or more network devices of claim 1, when the payload includes a HTTPS encrypted message and the one or more processors determine the device type ID and the category ID based on the TCP signature and the plurality of device signatures, the one or more processors select a device signature, among the plurality of device signatures, whose distance from the TCP signature is smaller than distances between the TCP signature and each of other device signatures.

9. The one or more network devices of claim 1, wherein the forwarded data includes a flow ID.

10. The one or more network devices of claim 1, wherein when the one or more processors update the plurality of device signatures based on the TCP signature, the device type ID, and the category ID, the one or more processors are to:
apply the TCP signature as input to an artificial neural network to update weights between neurons of the artificial neural network,
wherein the plurality of device signatures include the weights.

11. A method comprising:
receiving a Transport Control Protocol (TCP) segment from a user device, wherein the TCP segment includes a TCP header and a payload, and wherein the payload includes either a Hypertext Transfer Protocol (HTTP) plaintext message or a Secure HTTP (HTTPS) encrypted message;
extracting a TCP signature from the TCP header;
determining whether the payload of the TCP segment includes a HTTP plaintext message or a HTTPS encrypted message;
when the payload includes a HTTP plaintext message:
extracting contents of a HTTP User-Agent field from the HTTP plaintext message;
determining a device type identifier (ID) and a category ID based on the extracted contents; and
updating a plurality of device signatures based on the TCP signature, the device type ID, and the category ID;
when the payload includes a HTTPS encrypted message:
determining a device type ID and a category ID based on the TCP signature and the plurality of device signatures; and
forwarding data that includes the device type ID and the category ID to a network application.

12. The method of claim 11, wherein the TCP signature includes at least two of:
a value of a maximum segment size (MSS) field, a value of a window scale field in the TCP header, and a maximum value of the window size field.

13. The method of claim 11, further comprising:
storing the TCP signature, the device ID, and the category ID in a persistent storage.

14. The method of claim 11, wherein the network application is configured to provide a service or provide a function that depends on a type of the user device and a category of the user device.

15. The method of claim 11, wherein the device type ID indicates a model of the user device and the category ID indicates whether the device is Fourth Generation (4G) or Fifth Generation (5G) network communication capable.

16. The method of claim 11, wherein updating the plurality of device signatures includes:
applying a K-means clustering to the TCP signature and other TCP signatures.

17. The method of claim 16, wherein applying the K-means clustering includes computing an average value of a window scale field in the TCP header and an average of maximum values of the window size field.

18. The method of claim 11, wherein when the payload includes a HTTPS encrypted message, determining a device type ID and a category ID based on the TCP signature and the plurality of device signatures includes:
selecting a device signature, among the plurality of device signatures, whose distance from the TCP signature is smaller than distances between the TCP signature and each of other device signatures.

19. The method of claim 11, wherein updating the plurality of device signatures includes:
applying the TCP signature as input to an artificial neural network to update weights between neurons of the artificial neural network, wherein the plurality of device signatures include the weights.

20. One or more non-transitory computer readable mediums comprising computer-executable instructions, wherein when executed by one or more processors, the instructions cause the one or more processors to:
receive a Transport Control Protocol (TCP) segment from a user device, wherein the TCP segment includes a TCP header and a payload, and wherein the payload includes either a Hypertext Transfer Protocol (HTTP) plaintext message or a Secure HTTP (HTTPS) encrypted message;
extract a TCP signature from the TCP header;
determine whether the payload of the TCP segment includes a HTTP plaintext message or a HTTPS encrypted message;
when the payload includes a HTTP plaintext message:
extract contents of a HTTP User-Agent field from the HTTP plaintext message;
determine a device type identifier (ID) and a category ID based on the extracted contents; and
update a plurality of device signatures based on the TCP signature, the device type ID, and the category ID;
when the payload includes a HTTPS encrypted message:
determine a device type ID and a category ID based on the TCP signature and the plurality of device signatures; and
forward data that includes the device type ID and the category ID to a network application.

* * * * *